United States Patent [19]

Hansson

[11] Patent Number: 5,545,874
[45] Date of Patent: Aug. 13, 1996

[54] HOT-AIR OVEN FOR COOKING FOOD IN HOT AIR

[76] Inventor: Bengt H. Hansson, SE-436 44, Askim, Sweden

[21] Appl. No.: 295,850
[22] PCT Filed: Mar. 9, 1993
[86] PCT No.: PCT/SE93/00204
§ 371 Date: Oct. 17, 1994
§ 102(e) Date: Oct. 17, 1994
[87] PCT Pub. No.: WO93/18349
PCT Pub. Date: Sep. 16, 1993

[30] Foreign Application Priority Data

Mar. 9, 1992 [SE] Sweden .................... 9200717

[51] Int. Cl.$^6$ ..................... F24C 15/00; A47J 37/00
[52] U.S. Cl. ................. 219/400; 219/401; 126/21 A
[58] Field of Search ................... 219/400, 401, 219/681, 757; 126/21 A, 21 R; 99/467, 451

[56] References Cited

U.S. PATENT DOCUMENTS

| | | |
|---|---|---|
| 3,384,067 | 5/1968 | Rewald et al. . |
| 4,071,738 | 1/1978 | Jenn et al. . |
| 4,096,369 | 6/1978 | Tanaka et al. ..................... 219/757 |
| 4,155,294 | 5/1979 | Langhammer et al. ............. 219/400 |
| 4,295,419 | 10/1981 | Langhammer . |
| 5,204,503 | 4/1993 | Maiellano, Jr. et al. ............ 219/400 |

FOREIGN PATENT DOCUMENTS

| | | |
|---|---|---|
| 3209541 | 9/1983 | Germany . |
| 631802 | 8/1982 | Switzerland . |

*Primary Examiner*—Philip H. Leung
*Attorney, Agent, or Firm*—Dvorak and Traub

[57] ABSTRACT

The invention describes a device for cooking food without frying fat where touchable parts are kept well cooled and the food products can be taken out without the device having to be dismantled or tools being used and where the amount of watervapour in the food processing compartment can be regulated in such a way that optimum process quality can be reached. The invention solves these problems by the food processing taking place in the rotating food processing compartment (8) which is flushed by hot air driven by a fan (12) placed inside the oven compartment on five sides surrounded by the shell (2) and the sixth side of which is covered by a component consisting of the heat shield (4) and the cooling-air duct (5) broken through by the rotatable basket holder (6) with the basket (7) and with their corresponding heat shields (20,21) and cooling-air ducts (22,23). Cooling air is pressed by the fan system (13) into the housing (2) and further in through the openings (15) into the cooling-air duct (18) of the front panel. The food product is reached by withdrawal of the basket (7) by means of the handle (46) without any opening procedure. The regulation of the amount of water vapour necessary for the quality of the food product is done by moving the ventilation slide (58) which in the same movement opens or closes the openings in the ventilation device (47) to the inlet opening (52), to the injector (56) where a part of the air enters and passes through to the ejector (57) where the air which enters via the injector (56) together with excess water vapour exits from the oven compartment (1) and is mixed with remaining cold air from the cooling-air fan (3) and continues into the surrounding air.

10 Claims, 5 Drawing Sheets

HOT-AIR OVEN FOR COOKING FOOD IN HOT AIR

BACKGROUND OF THE INVENTION

1. Field of the Invention

The present invention describes a hot-air oven for preparation of food in hot air, more specifically a hot air oven for preparation of food by hot air without the use of frying fat.

2. Description of the Prior Art

The technique to prepare food in a rotating cooking area being flownthrough by hot air, is already known. The prior-art ovens using this method have, when put into practical use, often been found to suffer from certain troublesome drawbacks, mainly high temperatures on parts that are touched when using the equipment and in many cases causing burns to the user, forcing him to use protective gloves, saucepan holders or other means of heat protection in order to remove the cooked product.

SUMMARY OF THE INVENTION

The invention eliminates all the drawbacks with witch the previous known inventions are afflicted. Individualle or in different combinations, these drawbacks have inhibited any practical use and therefore an economicial exploitation from the earlier inventions.

An advantage of the presented invention is avoiding burn-causing temperatures on any touchable parts of the oven.

Another advantage of the invention is that it improves the quality of the food product.

Yet another advantage of the invention is the use of the cooling system to cool the outer touchable housing as well as to improve the quality of the food product.

One further of the invention's advantages is that the temperature of the outsteaming cooling is reduced.

One more of the invention's advantages is the optimization of the hot air effect on the food product.

The present invention describes a hot-air oven, not only equipped with cooled outer surfaces under working conditions, but also equipped with a device for controlling the amount of water vapour in the oven compartment during the process, this being vitally important to obtain food products possessing desired specifications as regards external surface and consistency. These specifications may apply for instance to the colour and crispness of the surface, the moistness and the texture of the food product and even other qualities. This control can either be done manually or be working according to a predefined program for process regulation, e.g. a microprocessor, in which, according to the state and the weight of the product and the temperature and the duration of the process, dry air can regulate the humidity of the hot-oven compartment continuously or intermittently. The intermittent regulation can either take place in the beginning, in the middle or at the end of the process or in combinations of time periods proportional to the total duration of the process. The necessity of this is very characteristic for certain kinds of frozen products, especially those that already from the beginning contain a too high amount of water (e.g. frozen products which in freezing stage are glazed with ice, that is, covered with a protecting ice layer). In these cases, fast de-icing and removal of water vapour are important in the initial stages, thereby preventing the water, due to the air in the oven compartment being saturated with water vapour, from penetrating the food product and thus making it soggy and wet. To be able to control the amount of water vapour in the oven compartment is also of vital importance when cooking fresh goods. When in those cases it is necessary to add water vapour to the process, such addition can be done with any known method, and this part of the process regulation is not discussed in this presentation.

BRIEF DESCRIPTION OF THE DRAWINGS

The enclosed drawings shown an embodiment of a hot-air oven according to the present invention wherein.

Figure 1:
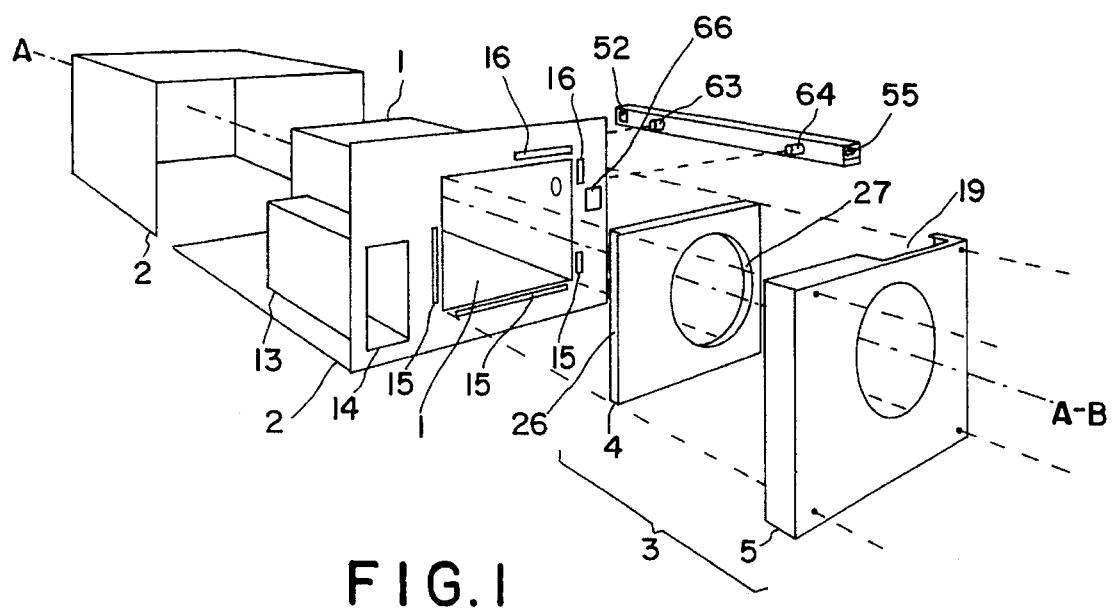
FIG. 1 is an exploded perspective view of an oven without a basket and basket holder.
Figure 2:
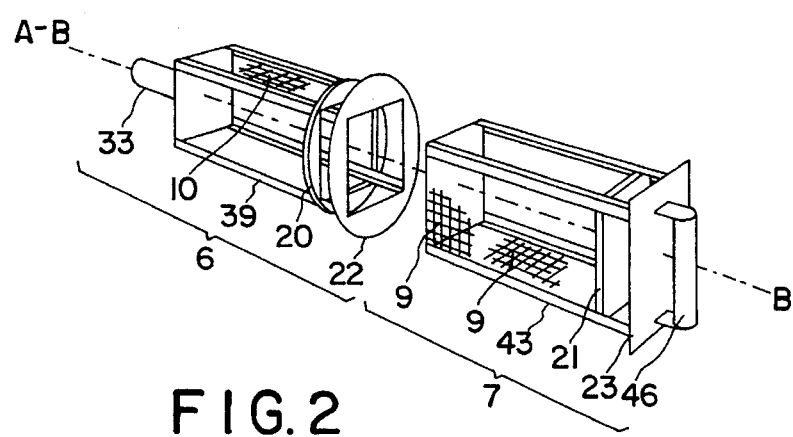
FIG. 2 is an exploded perspective view of a basket and holder.

The oven is constructed from a number of elements, see FIG. 1, all of them being an integrated part of the total function. Some of these elements are; an oven compartment 1, a surrounding housing 2, a front panel 3 that consists of a heat protecting shield 4, a recessed panel 5 and one part of a rotating basket holder 6 and a basket 7, FIG. 2, these jointly forming a food processing compartment 8. On three of its sides the basket 7 is covered with mesh 9, that surrounds the food processing compartment 8. The basket holder 6 is covered on the top side with mesh 10 that, when the basket 7 is pushed into the basket holder 6, forms the fourth net-covered side of the food processing compartment 8. All moving parts going through the walls of the oven compartment 1 are equipped with devices obstructing air passing in and out of the oven compartment 1. The oven compartment 1 is equipped with heating elements 11 for heating the air in the oven compartment 1 which is kept circulating by the means of a fan 12 (see FIG. 4). The housing 2 surrounds, in an air-tight manner, five out of six sides of the oven compartment 1. Inside this housing 2 a fan 13 is placed that sucks air through a filter 14 creating a perspective pressure in a space between the housing 2 and the oven compartment 1 (see FIG. 4). By placing two groups of holes in the housing 2, on calculated spots, one group of a large number of holes serving as cooling air outlets 15, and a smaller number of holes serving as air outlets 16 to the surrounding air, the oven compartment 1 can be flushed in a desired way by cooling air being passed in between the housing 2 and the oven compartment 1 by the fan 13. The air coming out of the housing 2 through the larger group of holes 15 is used as cooling air in the front panel 3. In order to allow more advantageous use of, and thus to reduce, the airflow is created by the fan 13 and has to cool the front-panel 3, the oven compartment 1 is equipped with a insulating material 17, FIGS. 4 and 5, on sides that are surrounded by the housing 2, which minimizes the heat absorption of the airflow generated by the fan 13 from the oven compartment when the cooling air is passing around it, before being pressed out in the front panel 3 through the holes 15.

Figure 3B:
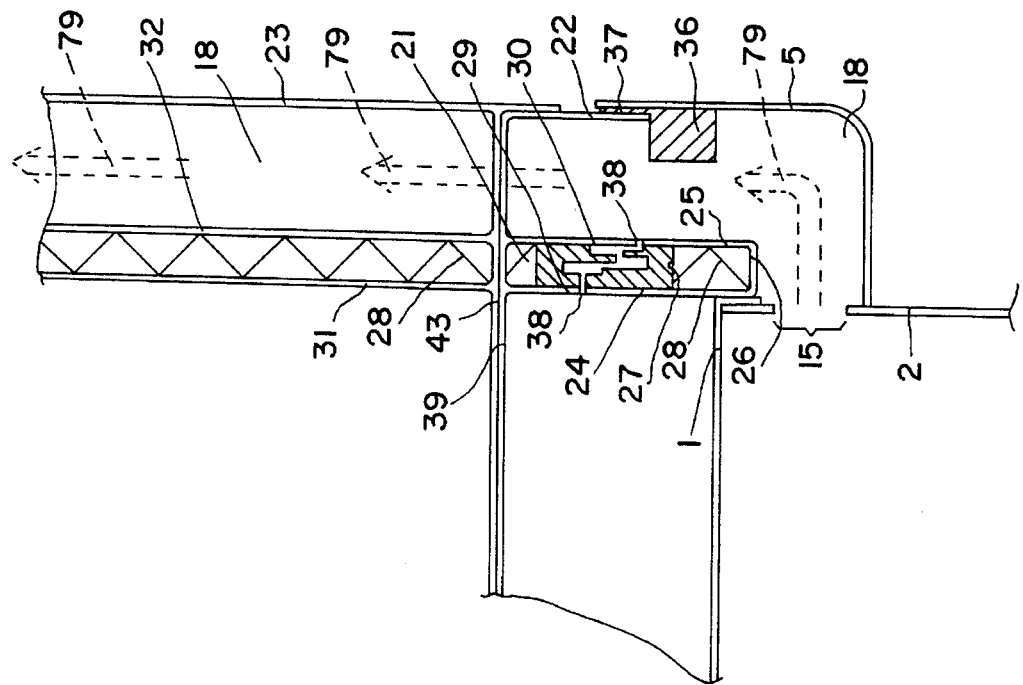
FIG. 3B is a partial cross-sectional view as shown in FIG. 3A, detailing a second seal design between two stationary and rotating sections.
Figure 3A:
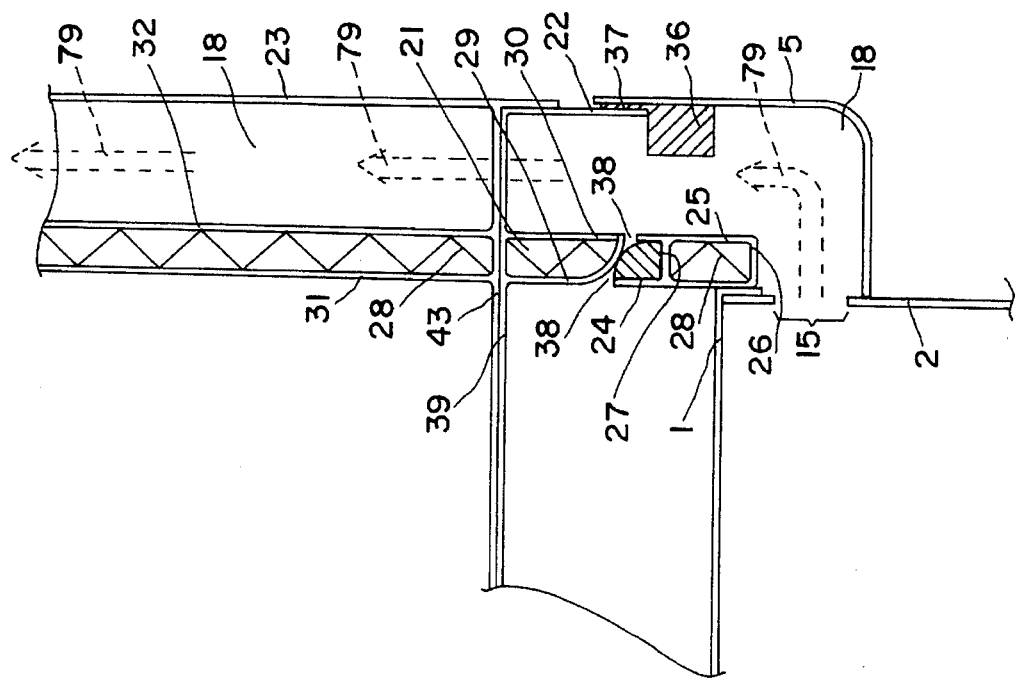
FIG. 3A is a partial cross-sectional view through part of the oven detailing a first seal design between the stationary and rotating sections.

The front panel 3 consists of two components. At the inner side the part, i.e. the sealing heat shield 4, which points side 4A directly towards the oven compartment 1, thereby forming the sixth side of the housing 2 which surrounds the oven compartment 1, and the second is a raised panel 5 connected to side 4B of heat shield 4 and, which surrounds the heat shield 5 is the only part of the front panel that is touchable from the outside. The inner part of the heat shield 4 is exposed to some of the openings 15 which serve as outlets for the main part of the cooling air that is forced into the space between the housing 2 and the oven compartment 1 under pressure by fan 13. The outer part of the front panel 3, the raised panel 5, surrounds the cooling air openings 15 and forms an air duct 18, FIGS. 3A and 3B which outlets 19 to the surrounding air, is in such a relationship to the openings 15 that a controlled airflow is obtained through the whole of the front panel 3. This provides even temperature control of the touchable parts of the front panel 3 at an optimally lowest temperature. The function is analogous even when both parts 4 and 5 of the front panel 3 are broken through in such a way that a rotating food processing compartment 8 can be reached without dismantling the front panel 3. The basket holder 6, the basket 7 are designed analogous to the front panel 3 in such a way that a similar heat shield is provided in the corresponding units 6 and 7, respectively, as parts 20, 21 and together with the similar coding-air duct 5 corresponding units in the 22, 23 respectively as parts functionally form a thermal and aerodynamical part of the total front panel 3. The air inlet into the front panel 3 through the air outlets 15 in the housing 2 should be placed as far away as possible from the air outlets 19 while still providing thorough and even cooling airflow through the cooling-air duct 18.

One part of the airflow, which is used in the front panel 3 to reduce the temperature of touchable parts, is allowed to flow out of the housing 2 through the holes 16 in such a way that this airflow, physically outward of the front panel 3, is mixed with air that flows out through the outlet opening 19 that airflow having been heated during its travel through the front panel 3 and through the similar panels of the basket holder 6 and the basket 7. The air, coming out through the holes 16, thereby not only directs this heated air out into the surrounding ambient air, away from the oven but reduces the temperature of the heated air to such a degree that it is not considered unpleasant to the user near the oven.

The heat shield 4 consists of two relatively closely placed metal plates 24, 25, see FIG. 3, which touch one another only of the outer edges 26 or, in the case of another object passing through, at the limited contact surfaces 27, of the heat protection shield 4. Due to the minimization of contact surfaces between the inner 24 and the outer 25 metal plates in the heat shield 4, the conduction of heat in metal between the two plates is kept to a minimum. To keep the transportation of heat by convection and radiation between the inner plate 24 and the outer plate 25 at a minimum, the space between them is equipped with a insulation 28.

As mentioned the basket holder 6 and the basket 7 passing through the front panel 3 have corresponding heat shield and cooling-air duct part like that of the front panel 3 viz., heat shields 20, 21, and cooling-air ducts 22, 23. These parts 20, 21, 22, 23 are, when the basket holder 6 and basket 7 are pushed all the way in, co-extensive with the two parts 4 and 5 of the front-panel 3. The heat shield 20 of the basket holder 6 consists, in the same way as the heat shield 4 of the front panel of two plates, the inner plate 29 and the outer plate 30, and in the space between them insulation material 28 is placed. The heat shield 21 of the basket 7 is constructed from two plates in the same way as the heat shield 4 of the front panel 3, viz., the inner plate 31 and the outer plate 32 with filling material 28 between them.

Figure 5:
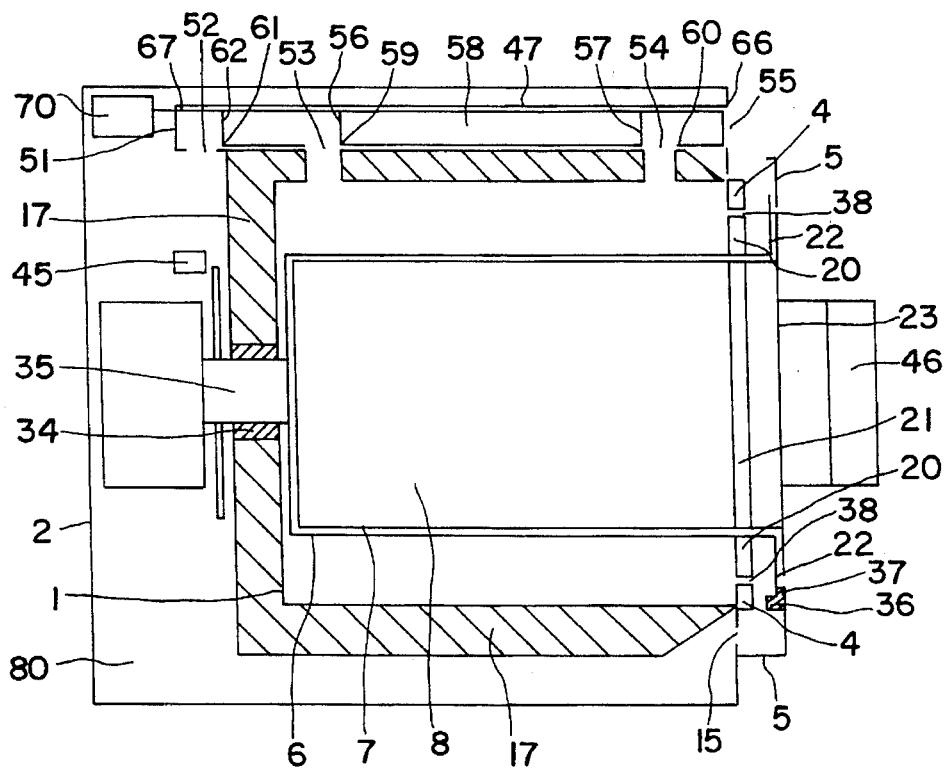
FIG. 5 is a cross-sectional view taken vertically through the longitudinal axis of the basket holder.

As seen in FIG. 5, the rotating basket holder 6, which by the means of a stub 33 is suspended in a driver unit 35, equipped with a sealing device 34, facing the oven compartment 1, and as mentioned includes the heat shield 20 and the cooling-air duct corresponding to part 22. The raised panel 5 serves also as holder for the front support bearing consisting of a support block 36 that absorbs the radial movements of the basket holder 6, and of a sealing and supporting part 37 that has the purpose of supporting outwardly directed axial movements. Thus, the rotating basket holder 6 is kept in place both radially and axially, and thereby the heat shield 20 is kept co-extensive with the heat shield 4 of the front panel 3 and in continuous contact with the sealing part 37. The basket 7 also has a heat shield 21 and a cooling-air duct 23 that, when the basket 7 is pushed all the way into the basket holder 6, have their respective heat shields 20, 21 and cooling-air ducts 22, 23 co-extensive with the heatshield 4 and the raised panel 5 of the front panel 3. Between the static and dynamic parts of the heat shield 4 and 20, 21, respectively there is a gap 38, designed with a fitted sealing to obstruct air passage through the gap 38 due to pressure differences. The holes 15 are the outlets for air overpressure that is built up in the oven housing 2 by the fan 13. The air travel in the front panel 3 takes place in the space 18 between the heat shield 4 and the raised panel 5 and its corresponding units in the basket holder 6 and basket 7. The cooling air 79 that has passed through the front panel 3 is let out into the surrounding air through the outlets 19 and is directed away from the oven with the aid of a relatively small flow of air from the holes 16. The air emitted from the holes 16 is the air that has passed only through the space between the oven compartment 1 and housing 2.

Figure 4:
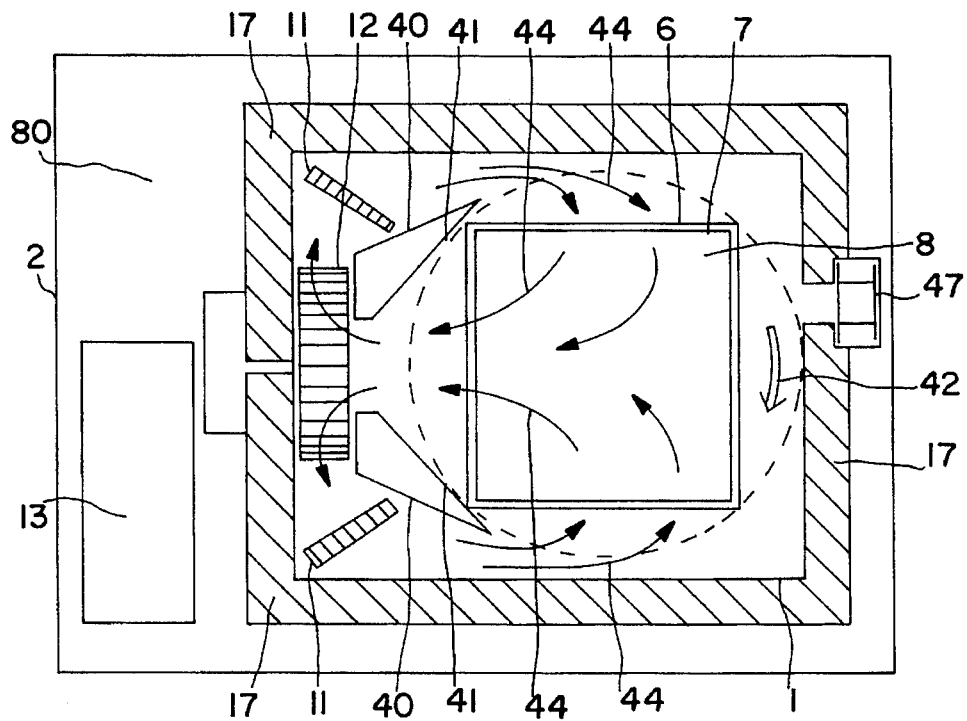
FIG. 4 is a cross-sectional view through the oven just behind the heat shield.

The oven compartment 1 the design of which can be varied in many different ways, is here shown in the FIGS. 3 and 4 by way of an example where in the food processing compartment 8 has a square cross-section in this example the oven compartment 1 is shown from the front in a section, cut in parallel with the front panel 3. The oven compartment 1 is built up in a way so that the air flow generated by the fan 12 through two ducts 40 is forced to pass through the electrically heated elements 11 before it enters into the main part of the oven compartment 1. At the recirculation of the air to the fan 12 the rotating food processing compartment 8 is at such a place in the oven's compartment 1 that the hot air, with aid of the ducts 40, is forced to a major part to penetrate the food processing compartment 8, formed by the basket holder 6 and the basket 7. The basket holder 6 is suspended by means of the stub axel 33 suspended in a driving device 35 outside the oven's compartment 1. It rotates clockwise according to the rotation arrow 42. Due to the shape of the food processing compartment 8 with its square cross section and with its corners in the periphery four times per revolution a condition appears implying that the corners of the food processing compartment, which are formed by the guides 39 of the basket holder 6 guiding the corners of the basket 7, and guides 43, are in the immediate nearness of the ducts 41. By this arrangement the air is forced, according to the hot air flow arrows 44, to penetrate the food processing compartment 8 itself. When the food processing compartment 8, which can be filled with food products up to two thirds, rotates, this results in the fact that the product enclosed in the food processing compartment 8 goes against one of the four sides of the food processing compartment 8 that moves upwards, and which temporarily during one revolution of rotation four times more or less covers the way of return of the air flow back to the fan 12. This condition forces the hot air to flow around or through the product to be prepared at the same time it is mixed therewith, resulting in a more efficient exposure of the food to the hot air flow, thereby giving a more even preparation of the products.

After a necessary time of preparation, the shut down of the oven is effected with a timer or manually. Through a switch 45 controlling the position of the basket holder 6, the latter always stops in such a manner that the basket 7 is turned with its opening facing upwards. The basket 7 is withdrawn by means of a handle 46 attached to the heat shield 21 of the basket 7.

The ventilating unit 47, FIG. 5 which controls the proportion of water vapor in the oven compartment 1, must be shaped so that, together with the heat shield 4 penetrated by the basket holder 6 and the basket 7, it cooperates for optimum preparation of the food products. The gap 38 between the static part and the dynamic part of the heat shield with the basket holder 6 and basket 7 inserted would ideally be filled with a sealing ring which in an ideal situation would be quite tight. However, due to the high temperature, sometimes more than 300° C., together with the mechanical wearing such a sealing ring would not have the strength and serviceable life within reasonable cost limits. For this reason the gap 38 is allowed to let through a small amount of air. Considering that the parts forming the gap 38 shall be robust and endure rough treatment to a certain degree, the gap 38 cannot be given too small of tolerances. The resistance of the air flow can be increased by changing the shape of the gap 38. In one example shown the gap 38a, in FIG. 3a has been sealed with a ceramic textile braid, placed into the static heat shield 4. Tests, which have turned out satisfactorily, have also been done without a gasket and in this case the opposed surfaces of the gap 38b, of FIG. 6b, were provided with channel means, providing a braking maze effect to the air. All gaskets had the common feature that they were efficient in braking the air flow yet not very tight.

The sealing device 34 that surrounds the driver unit 35 is conventionally manufactured. In the example above, due to the high heat it is, made of a ceramic material, which in a cheap and simple way fulfills its function at the actual rotation speed of barely 0.1 RPS, despite the fact that in this design, it is not totally impervious to air.

The fan 12 for the hot air of the oven, rotating at up to 50 RPM, and where the temperature of the shaft is relatively high, cannot be provided with an ideal gasket either. The air leakage is however, kept at a very low level through conventional procedures commonly used with radial fan wheels on the cold side of the shaft as well. All the tolerances are narrow, but should the difference in air pressure be large at both shaft ends there will be some air leakage, which, however, is very small.

Tests have shown that different effects can arise, which are dependent on the shape of the ventilating device as well as the co-ordination of the different parts of the oven and their functions.

One of the undesired effects that has emerged from the tests is the fact that, if the oven compartment 1 has been provided with a ventilating device that is continuously in direct and open contact with the surrounding air, an overstream of air will appear at the gap 38, mainly arising from the cold air duct 18 of the front panel 3, due to the prevailing difference of air-pressures as well as from the two through holes for the shafts of the fan 12 and for the driver unit 35. This can result in over-aerating in compartment 1, resulting in overly dried and hard food products.

Another undesired effect is that if the sealing device 34 around the driver unit 35 and the through-holes of the shaft of the fan 12, are very leaky, and if the ventilating device does not have an atmospherical connection, the cooling air from the space between the oven compartment 1 and the housing 2 penetrates into the oven compartment 1, forcing hot air into the cooling air that passes through the cooling air duct 18, which could lead to the upper right-hand corner of the heat protecting-shield 4 getting warm. The reason for the hot air air-pressure in the outer housing 2 is greater in relation to the air-pressure of the cooling air duct 18.

All the undesired effects, which can be detrimental to the function referred to, can be reduced to a practically negligible level by the mode of operation of the ventilating device 47, described below, and shown as an example of design in FIGS. 5 to 8.

Figure 6:
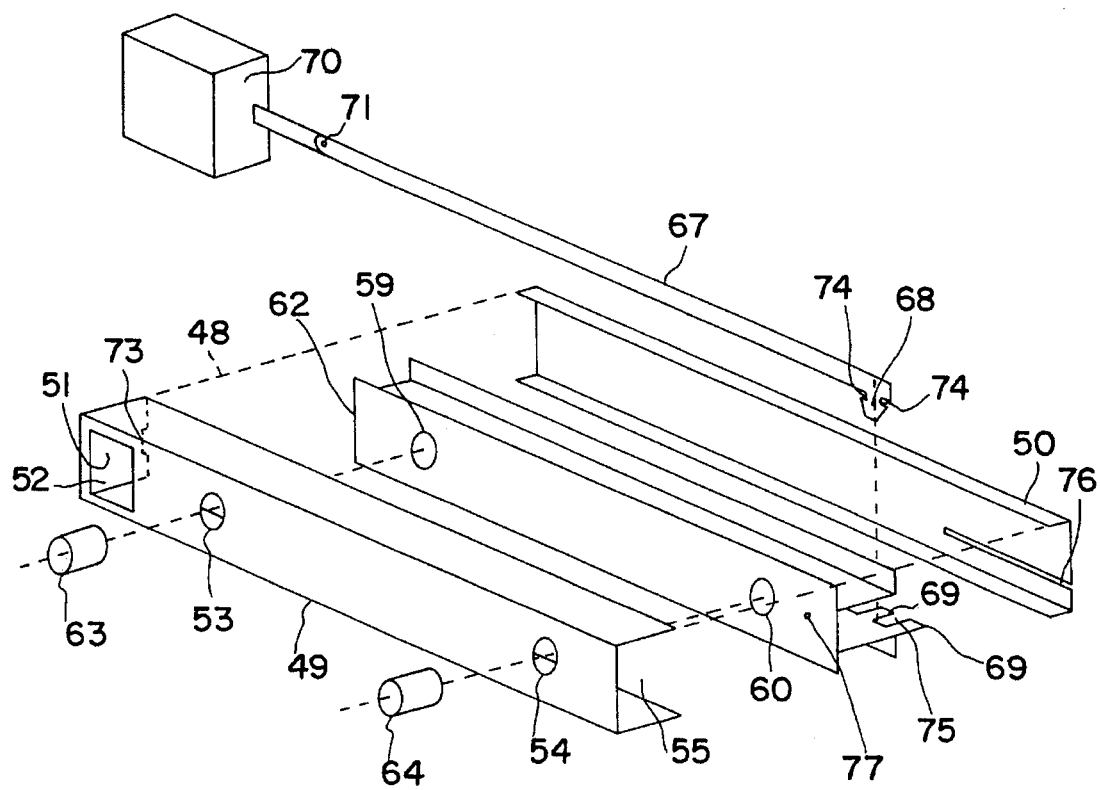
FIG. 6 is an exploded perspective view of a ventilation device which controls the water vapor inside the oven during operation.
Figure 7:
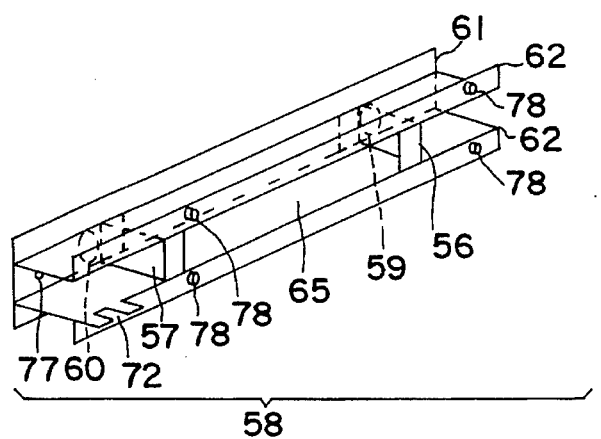
FIG. 7 is a perspective view of a ventilation slide member.
Figure 8:
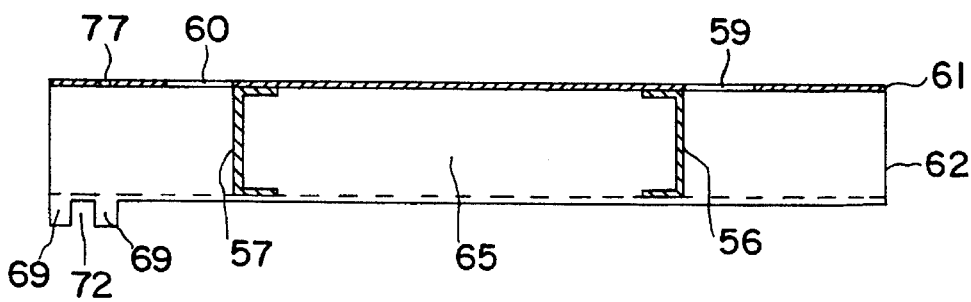
FIG. 8 is a cross-sectional view through the length of the ventilation device of FIG. 6.
Figure 9:
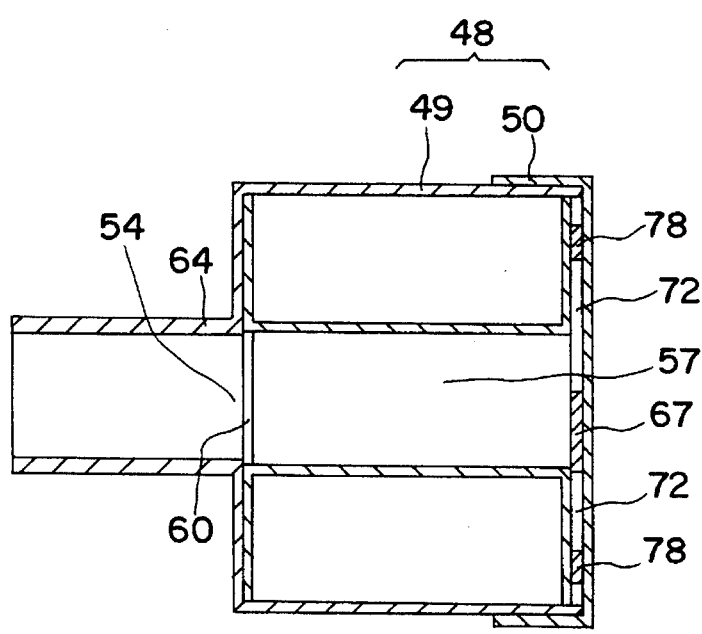
FIG. 9 is a cross-sectional view through an injector mounted to the ventilation device of FIG. 6.

The ventilating device 47 is made of a ventilating tube 48, FIG. 6, comprised of a three-side enclosing part 49, a cover 50, and an end piece 51 closing one end of the end ring part. The ventilating tube 48 has four openings. One inlet opening 52 for the ventilating air, one injector opening 53, one ejector opening 54, and one outlet opening 55. In the ventilating tube 48 there is an injector 56, FIG. 7, and an ejector 57, both totally integrated with the ventilating slide 58. The ventilating tube 48 runs in parallel with one of the sides of the oven compartment 1 outside its insulating material 17, and in the simplest embodiment with regard to construction, also in parallel with the longitudinal axis of the basket holder 6. The ventilating tube 48 in this case stretches from the front of the housing 2 to the rear edge of the oven compartment 1, including its isolating material 17, and protruding further at least over a distance corresponding to the width of the ventilating tube 48. In this protruding part the inlet opening 52 for the ventilating air is found. Inside the ventilating tube 48 the ventilating slide 58 is lodged, displaceable in the lengthwise direction of the ventilating tube 48. The ventilating slide 58 with the injector 56 and the ejector 57, have one opening each in the ventilating slide 58. These openings are named injector value 59 and ejector valve 60. The valve 61 of the inlet opening 52 consists of all the rear part 62 of the ventilating slide 58. The three valves 59, 60, 61 open at the same time, when the ventilating device 47 is switched on for function as a result of the ventilating slide 58 moving in a direction towards the front panel 3. In this position the valves 59, 60, 61 of the ventilating slide 58 open up the ventilating air inlet opening 52 to the ventilating device 47 as well as the opening to the injector tube 63 and to the ejector tube 64. The three openings are all situated in the middle side of the ventilating tube 48, that is, in the part 49 that encloses the three sides. The fourth opening of the ventilating tube 48, the outlet opening 55, is always open independently of the position of the ventilating slide 58. The injector 58 and the ejector 57 can be identical as to their design. As shown in the example they can be given a U-shape with the legs of the U being about one and a half times longer than the width thereof. The U-shaped injector 56 and the ejector 57 enclose their their respective injector and ejector ventilating openings 53 and 54, when the ventilating slide 58 is in its open front position. Between the injector 56 and the ejector 57 there is a ventilating tube filling 65. The filling has the same width and height as the front surfaces of the injector 56 and the ejector 57, respectively.

The cross-sectional area of the ventilating tube 48 perpendicularly to the airstream is at least twice as large as one of the cross-sectional areas of the injector valve 59 or the ejector valve 60. The air stream in the ventilating tube 48 between the injector 56 and the ejector 57 will then be larger than the heated, moisture saturated air that has passed through the oven compartment 1.

Owing to this arrangement, the warm ventilating air mixes, at the outlet opening 55, with the cold bypass air, so that the resulting air temperature is safe. The temperature can be regulated by varying the proportion between the ventilating air and the bypass air. The inlet opening 52 is at least as large as the cross-sectional area of the ventilating tube 48.

The outlet opening 55 of the ventilating tube 48 is placed in front of a front opening 66 in the front wall of the housing 2. The injector 56 is placed close to the air inlet through the inlet opening valve 61, and has its opening directed inwards towards the air stream direction. The ejector 57 is placed near the outlet opening 55, and has its opening turned outwards towards this. The distance between the inlet opening valve 61 and the injector valve 59 must be large enough to receive the ventilating slide 58 therebetween without causing an opening. Through the injector tube 63 the injector valve 59 is connected to the oven compartment 1, and so too is the ejector valve 60, through the ejector tube 64. The distance in the oven compartment 1 between the injector tube 63 and the ejector tube 64 must not be too small or else the ventilating air inside the room of the oven compartment 1 shall not have enough time to be warmed up and saturated with water vapour before it is ejector. Consequently the injector tube 63 is placed near the rear wall and the ejector tube 64 near the heat protecting shield 4 in the oven compartment 1.

The ventilating slide 58 is moved by a coupling bar 67 provided with a coupling hook 68, which is coupled together with the ventilating slide 58 in the slide coupling 69. A motor 70 of conventional type with a forward and backward movement is connected to to the coupling bar 67 in such a way that it is moveable vertically. The coupling bar 67, being of small thickness, runs close to the lid 50 of the ventilating tube 48 within the intervening space 72, which space is slightly larger than the thickness of the coupling bar 67. The latter extends to the joint 71 via a slot 73 in the rear closed part 51 of the ventilating tube 48. The coupling hook 68 of the coupling bar 67 is formed with two opposite notches 74 of V-shape, whereby the coupling hook 68 remains in the slide coupling 69 during the forward and backward movement of the coupling bar 67. In the slide coupling 69 there is an opening 75 large enough to barely lift the coupling notch 68 and disconnect it from the ventilating slide 58. The slide coupling 69 is long enough to extend slightly outside the lid of the ventilating tube 50 through a slot 76, and this prevents the thin coupling notch 68 from sideway disengagement from its fastening in the slide coupling 69. The slot 76 is long enough to let the ventilating slide move freely forwards and backwards between the open and closed positions. It travels all the way out to the front edge of the ventilating tube 48. There the ventilating slide 58 can then be removed for cleaning by lifting up the coupling notch 68 and be taken out through the outlet 55 and the front opening 66.

In the part of the ventilating slide 58 covering the ejector tube 64, when the ventilating slide 58 is in a closed position, there is a small opening 77 the size of which is adapted to the overpressure made by the cooling air fan 13 of the in the outer housing 2 and the amount of air that can get into the oven compartment 1 via the leakage at the passing through of the shaft and at the edge 27 of the heat protecting shield 4. When this opening 77 is properly sized an overpressure, which is not significant, is formed in the oven compartment 1. Under these circumstances no hot air will force from the oven compartment 1 into the cooling air duct 18, to otherwise diminish the affect of the cooling air. Perfect pressure equalization through this simple method is unrealistic; however, the pressure differences, either in a positive or negative direction, have been found to be negligible.

I claim:

1. A hot air oven for preparing food, said oven comprising:

a generally rectangularly-shaped oven compartment having a top and a bottom wall, a back wall, and a first and a second side wall, each of said walls interconnecting so as to define an open, front end of said oven, and a generally rectangularly-shaped oven compartment in communication with said open, front end, said oven compartment defining an oven interior;

an air-cooled front panel comprised of a rotatably movable section and a stationary section, said stationary section enclosing said open, front end leading to said oven interior, said movable section removably insertable through a cut-out in said stationary section such that said movable section is generally centered within said interior of said oven, each of said sections comprised of a like first and second component, wherein said first component is a heat shield which coincides with and seals said open, front end of said oven, and said second component is a raised panel which envelopes said heat shield, said heat shield and said raised panel sealingly connected together such that a space exists therebetween which defines an air-cooling duct for communicating a stream of cooling air therethrough, said cooling air maintaining said front panel below a burn-causing temperature, said front panel including a discharge outlet formed in said raised panel for communicating said cooling air out of said cooling duct and into a surrounding atmosphere which exists about said oven, said rotatable section forming a hot-air food processing compartment within said oven interior, said food processing compartment defined by a food-holding basket and a basket holder, said food-holding basket slidably insertable within said basket holder, thereby cooperating to retain said food within said food processing compartment during operable rotation thereof when said oven is cooking said food;

an air-tight outer housing comprised of a top and a bottom wall, a front and a back wall, and a pair of side walls interconnecting with said top, bottom, front, and back walls, said housing generally conforming to said oven compartment, said top, bottom, back, and side walls of said housing in a spaced confronting relationship to corresponding said walls of said oven compartment, such that a space exists therebetween, said front wall of said housing coextensive with said open, front end of said oven compartment and having an opening therein which is congruent with said oven compartment, said housing front wall including a filtered ambient-air inlet, a front opening indirectly communicating with said oven compartment interior, a plurality of cooling air passages located along said oven compartment bottom and side walls which are in communication with said air cooling duct of said front panel, and a plurality of discharge openings in communication with said discharge outlet of said front panel, said raised panel of said oven front panel enveloping said front opening, each of said cooling air passages, and each of said discharge openings;

means for providing a flow of said ambient air into said interior of said oven compartment, said air flow means disposed within said space between said housing and said oven compartment;

means for heating said air communicated into said oven compartment, said heating means disposed within said oven compartment interior;

means for directing said flow of heated ambient air to said food processing compartment, said directing means disposed close to said air heating means;

a ventilation device for controlling a water vapor content of said air circulated within said oven compartment interior, said device comprised of an elongate, a tube having an open end and a closed end, and a ventilating slide member inserted within said tube, and slidable therein between a first injector position and a second ejector position, said injector position corresponding to an oven operating condition wherein water vapor is added to the oven compartment interior, and said ejector position corresponds to an oven operating condition wherein water vapor is withdrawn from said oven compartment interior.

2. The hot-air oven as claimed in claim 1, wherein the air flow means is a cooling air fan arranged to induce ambient cooling air into said filtered ambient air inlet for cooling all of the sides of the oven compartment, and for keeping the front panel of the oven at a touch-safe temperature and to provide the ventilation device with a sufficient airflow in order to accomplish injector and ejector effects.

3. The hot-air oven of claim 1 wherein said front opening in said front wall of said housing is in communication with the open end of the ventilation device wherein air within said oven compartment interior can be communicated into said ventilator device and then through said open end thereof, into said front opening for discharge to the atmosphere through said discharge outlet in said front panel.

4. The hot-air oven of claim 3 wherein said ventilation device is arranged to regulate the water vapor content in the oven compartment by using a part of the cooling air flow to reduce an energy and a vapor content of the air discharged to atmosphere.

5. The hot-air oven of claim 4 wherein said ventilation device is mounted in the space between the oven compartment and the housing and is in communication with said air cooling duct.

6. The hot-air oven of claim 5 wherein the ventilation tube is equipped with openings in the form of inlet openings, an injector opening and an ejector opening together with a movable ventilation slide.

7. The hot-air oven of claim 6 wherein said ventilating slide member further includes a closed position, said closed position is arranged to allow the oven compartment to be connected to the atmosphere via a pressure relief device.

8. The hot-air oven of claim 1, wherein said plurality of discharge openings are arranged to emit air from the air cooling duct so as to direct and reduce a temperature of the air communicated from within said oven interior through said front opening.

9. The hot-air oven of claim 1, wherein the cooling air flowing through the air cooling duct of the front panel is continuous, and independent of the position of the ventilating slide member and are in a predetermined and controllable relation to one another.

10. The hot-air oven of claim 1, wherein the air cooling duct receives all the outstreaming or sucked-in air passing said cooling air passages.

\* \* \* \* \*